Patented Nov. 7, 1922.

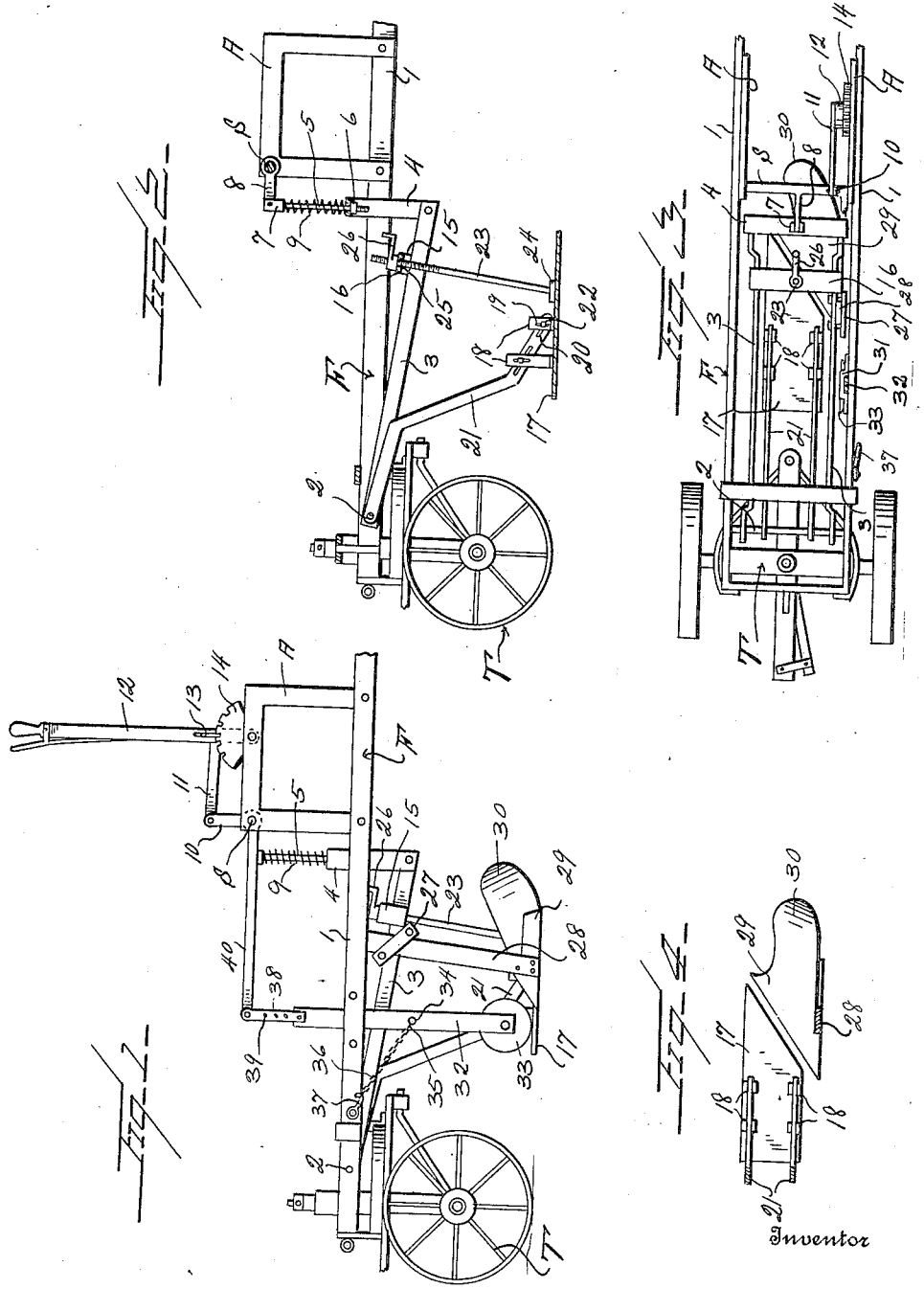

1,434,834

UNITED STATES PATENT OFFICE.

MERRELL S. MONTAGUE, OF TWIN FALLS, IDAHO, ASSIGNOR OF ONE-HALF TO JOSEPH W. JONES, OF RIGBY, IDAHO.

BEET HARVESTER.

Application filed May 15, 1920. Serial No. 381,630.

*To all whom it may concern:*

Be it known that I, MERRELL S. MONTAGUE, a citizen of the United States, residing at Twin Falls, in the county of Twin Falls and State of Idaho, have invented certain new and useful Improvements in Beet Harvesters, of which the following is a specification, reference being had to the accompanying drawings.

This invention relates to certain improvements in beet harvesters and is an improvement over the device particularly disclosed in my prior Patent No. 1,337,481, dated Apr. 20, 1920, and it is an object of the invention to provide a machine for harvesting beets and the like embodying novel and improved means for topping the beets, or the like, which means automatically adjust themselves relative to the crown of the vegetable in order to assure the requisite severance of the tops.

Furthermore, it is an object of the invention to provide a novel and improved device of this general character embodying a topping mechanism automatically adjustable vertically in accordance with the occasions of practice necessitated by the crowns of the beets, together with a cutting means at one side of said topping mechanism and operating to cut or sever side leaves and to cut weeds and other trash, turning said separated matter out of the way of the topping mechanism.

The invention consists in the details of construction and in the combination and arrangement of the several parts of my improved harvester whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating a beet topping mechanism constructed in accordance with an embodiment of my invention;

Figure 2 is a longitudinal vertical sectional view taken through the device as illustrated in Fig. 1;

Figure 3 is a fragmentary view in top plan of the structure as illustrated in Figure 1; and Figure 4 is a fragmentary view partly in horizontal section and partly in top plan of the compression plate and the topping knife associated therewith and as herein embodied.

As disclosed in the accompanying drawings, F denotes the main machine frame and coacting with the forward end portion of said frame is a supporting truck T of any ordinary or preferred type and which is preferably of a character whereby the direction of travel of the machine may be readily regulated or controlled by said truck.

The forward portions of the side bars 1 are connected by a transversely disposed rod or bar 2 with which are operatively engaged the forward end portions of the rearwardly and downwardly directed elongated members 3 having swinging movement in a vertical direction. The rear or lower portions of the members 3 are secured to the lower portions of the side arms or legs of an upstanding yoke or arch 4 snugly fitting between the side bars 1 but capable of movement freely therebetween. Loosely disposed through the central portion of the arch or yoke 4 is a bolt 5 having its lower portion provided with a nut 6 for contact from below with said central portion of the member or yoke 4. The upper end portion of the bolt 5 is provided with a flattened head 7 with which is operatively engaged the outer end portion of a rock arm 8 extending forwardly from a shaft S. Interposed between the member or yoke 4 and the head 7 is an expansible member or spring 9 which operates to constantly urge the member or yoke 4 downwardly yet permits the same to have upward movement when the occasions of practice may require.

The shaft S is also provided with an upstanding rock arm 10 with which is operatively engaged a link or lever 11 also operatively engaged with an upstanding lever 12 pivotally engaged with a side frame A. The lever 12 is provided with a conventional latch mechanism 13 coacting with a rack 14 carried by the adjacent side frame A. By proper manipulation of the lever 12, the yoke or member 4 and the members 3 may be raised or lowered as required by the occasions of practice and normally locked in such position with the exception of the independent movement afforded by the connection between the member 4 and the rock arm 8 as afforded by the bolt 5 and the spring or expansible member 9.

The lower end portions of the members 3 at a point in advance of the yoke or member 4 but in relatively close proximity thereto are provided with the upstanding standards 15 connected at their tops by the cross member 16.

17 denotes a substantially flat compression plate of desired dimensions and which has its rear transverse margin or edge obliquely disposed. The side marginal portions of the plate are provided with the upstanding lugs or brackets 18 provided with the vertically disposed slots 19 which intersect the longitudinally disposed slots 20 provided in the lower and rear end portions of the rods 21. The rods 21 are substantially sigmoidal in form and have their forward or upward extremities pivotally engaged with the rod 2, hereinbefore referred to. Disposed through the registering slots 19 and 20 are the clamping members or bolts 22 whereby the compression plate 17 may be adjusted as required longitudinally of the rods 21 or vertically with respect thereto and also whereby the vertical angle of the plate may be regulated.

An elongated bolt 23 is secured at its lower end to a lug 24 extending upwardly from the upper face of the plate 17 and the opposite end portion of said bolt is loosely disposed through an opening 25 arranged substantially midway of the connecting bar or cross member 16. A crank 26 is threaded upon the upper extremity of the rod 23 and contacts with the upper face of the cross member 16. By properly rotating the crank 26, the rod 23 may be raised and lowered, together with the compression plate 17, so that said plate 17 may be positioned as desired.

Clamped, as at 27, to a member 3 adjacent the standard 15 carried thereby is a standard or sheth 28, said clamping means 27 permitting said standard or sheth 28 to be vertically adjusted as may be desired. The lower end portion of the standard or sheth 28 is secured to a side marginal portion of a beet topping knife 29 having its working or cutting edge substantially in parallel relation to the inclined or oblique edge of the compression plate 17. The topping knife 29 is provided with a rearwardly and upwardly curved wing 30 which operates to direct the severed tops transversely to one side of the machine.

One of the side bars 1 of the frame F, at a point in close proximity to but in advance of the standard or sheth 28, is provided with an outwardly arranged and vertically disposed loop or wing plate 31 through which is slidably disposed a vertically arranged standard 32. Operatively supported by the lower end portion of the sheth 32 is a concave cutting disc 33. The lower end portion of the standard 32 above the disc 33 is provided with an opening 34 in which is engaged a clevis 35. Secured to the clevis 35 is a chain 36 which extends to and is engaged with a clevis 37 suitably fastened to the adjacent side bar 1 at a predetermined point in advance of the standard 32. The chain 36 serves as a draft or pulling element for the lower portion of the standard 32 and also operates to hold the same against rearward swinging movement or stress to which it is subjected during a working operation.

Pivotally engaged with the upper end portion of the standard 32 is a link or bar 38. The bar or link 38 is provided with a series of longitudinally spaced openings 39 whereby the outer or free end portion of a rock arm 40 may be adjustably engaged therewith. The rock arm 40 is carried by the shaft S and extends forwardly therefrom. The adjustable connection between the rock arm 40 and the bar or link 38 permits a regulation or control of the pressure of the disc 33. It will also be readily noted that the rock arm 40 operates to raise or lower the standard 32 in unison with the raising or lowering of the arch member or yoke 4 and the side members 3. The disc 33, being positioned to one side of the machine, operates to cut off side leaves of the tops or to cut weeds and the like so that the same will not offer any resistance or hindrance to the proper and effective operation of the machine and more particularly the topping mechanism.

When the machine is in operation, the plate 17 rides over the tops of the beets or the like irrespective of the height of the crowns thereof and the connection between the member or yoke 4 and the rock arm 8 readily permits the plate 17 to rise or lower in accordance with the differing heights of the crowns of the beets so that the desired topping is assured at all times.

The shaft S hereinbefore referred to is disposed transversely of the frame F and rotatably supported by the forward portions of the upstanding side frames A carried by the side bars 1.

From the foregoing description, it is thought to be obvious that a beet topping mechanism constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A beet harvesting machine comprising a portable frame, a pair of transversely spaced rods operatively engaged with the frame for vertical swinging movement, said rods extending rearwardly on the frame, a compression plate provided at its side portions with upstanding lugs, said rods and lugs being provided with overlying slots, clamping members disposed through the slots, and a topping blade positioned rearwardly of the compression plate.

2. In a beet harvesting machine, a frame, a pair of elongated members spaced transversely of the frame and supported thereby for vertical swinging movement, a cross member carried by said members, means for swinging said members, a compression plate, rods pivotally supported by the frame, means for connecting said rods to the compression plate, an elongated vertically disposed member having its lower portion operatively engaged with the plate, the upper portion of said member being freely disposed through the cross member, a nut threaded upon said last named member above the cross member whereby the compression plate may be vertically adjusted, and cutting means associated with the compression plate.

3. In a beet harvesting machine, a portable frame, an element operatively engaged with the frame for vertical swinging movement, a compression plate, supporting means for the plate operatively engaged with the frame, a vertically disposed member having its lower portion operatively engaged with the plate, the upper portion of said member being freely disposed through the element, said vertically disposed member and element being provided with coacting means whereby the compression plate may be vertically adjusted, and cutting means associated with the compression plate.

In testimony whereof I hereunto affix my signature.

MERRELL S. MONTAGUE.